United States Patent
Glaeser

[11] Patent Number: 6,053,830
[45] Date of Patent: Apr. 25, 2000

[54] POWER-SPRING ASSIST TO PEDALS OF BICYCLE

[76] Inventor: Robert C. Glaeser, 2400 Countryside Dr., Placerville, Calif. 95667

[21] Appl. No.: 09/137,764

[22] Filed: Aug. 20, 1998

Related U.S. Application Data

[60] Provisional application No. 60/056,743, Aug. 20, 1997.

[51] Int. Cl.[7] .............................. F16H 59/00; F16H 9/00; B62M 1/10
[52] U.S. Cl. ......................... 474/101; 280/215; 280/303; 474/69
[58] Field of Search .................... 474/50, 69, 70, 474/101; 74/594.1, 594.2, 594.3, 594.4; 280/215, 281, 255, 258, 288.1, 303

[56] References Cited

U.S. PATENT DOCUMENTS

| | | | |
|---|---|---|---|
| 635,664 | 10/1899 | Coursey et al. | 280/215 |
| 1,374,797 | 4/1921 | Zaborsky | 280/215 |
| 2,638,359 | 5/1953 | Crumble | 280/215 |
| 4,108,459 | 8/1978 | Alvigini | 280/215 |
| 4,416,464 | 11/1983 | Mattox | 280/215 |
| 4,655,472 | 4/1987 | Pletscher | 280/303 |
| 4,878,684 | 11/1989 | Lemle | 280/288.1 |
| 5,035,678 | 7/1991 | Hageman | 474/50 |

*Primary Examiner*—David A. Bucci
*Assistant Examiner*—Marcus Charles
*Attorney, Agent, or Firm*—Claude A.S. Hamrick; Michael K. Bosworth

[57] ABSTRACT

A spring-assist drive for a pedal-operated rider-propelled vehicle such as a bicycle which makes use of a wind-up coil spring mounted within the frame of the bicycle as auxiliary power. The spring is selectively wound by the rider operating the pedals to turn a spindle on which is mounted a sprocket wheel. A chain from the sprocket wheel drives a pivoting gear assembly comprising a ratcheting sprocket and attached drive gear. In a preferred embodiment, the tension on the chain will be adjustable by a chain tension adjustment mechanism. The drive gear releasably engages a power gear mounted on a common hub with the spring. A brake band and drum assembly holds the energy in the spring until the brake is released by the rider, whereupon the spring unwinds to drive a sprocket wheel mounted on the common hub, which sprocket wheel is connected to a sprocket wheel mounted on the spindle, turning the rear wheel drive sprocket wheel and the rear wheel.

9 Claims, 6 Drawing Sheets

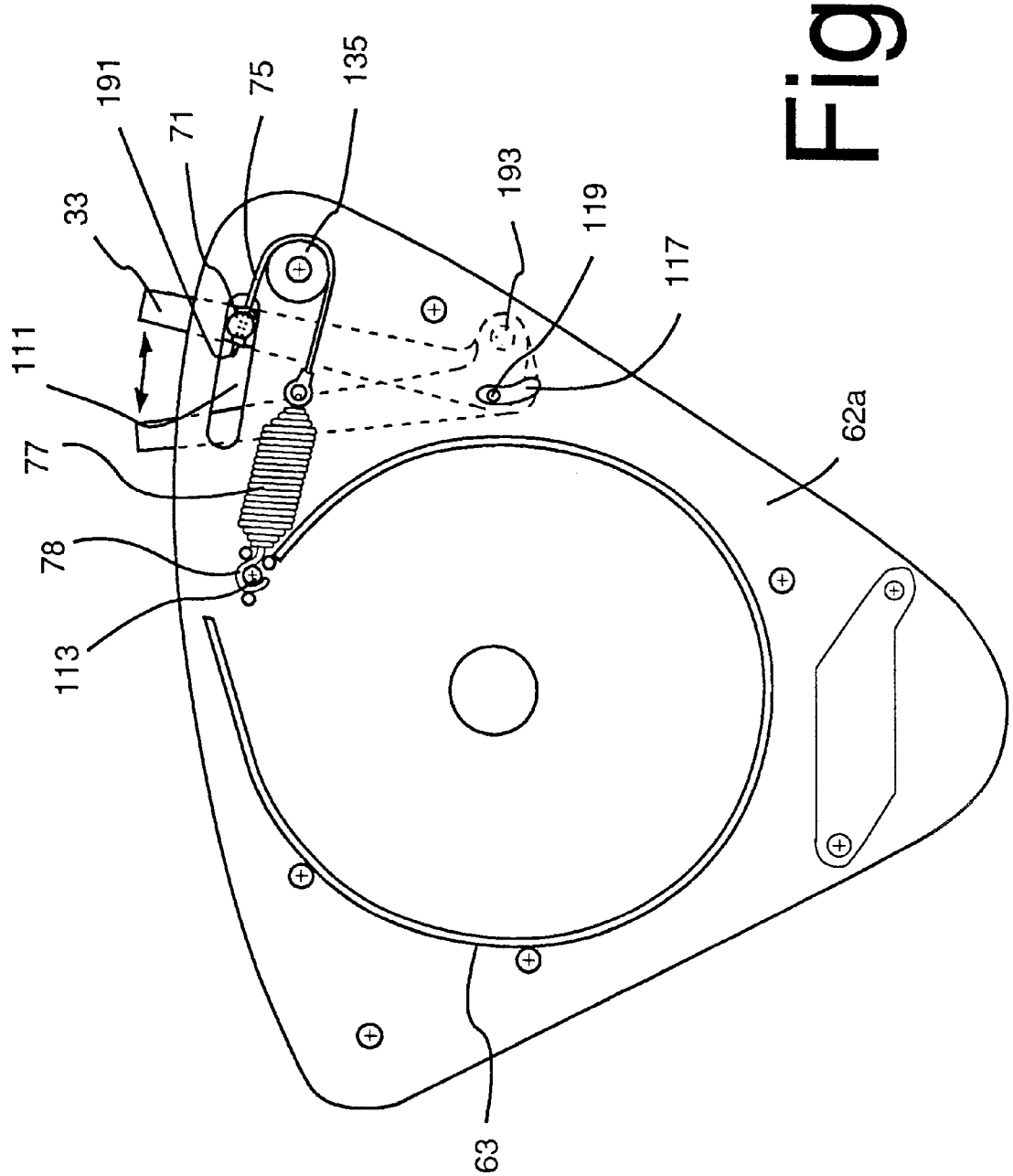

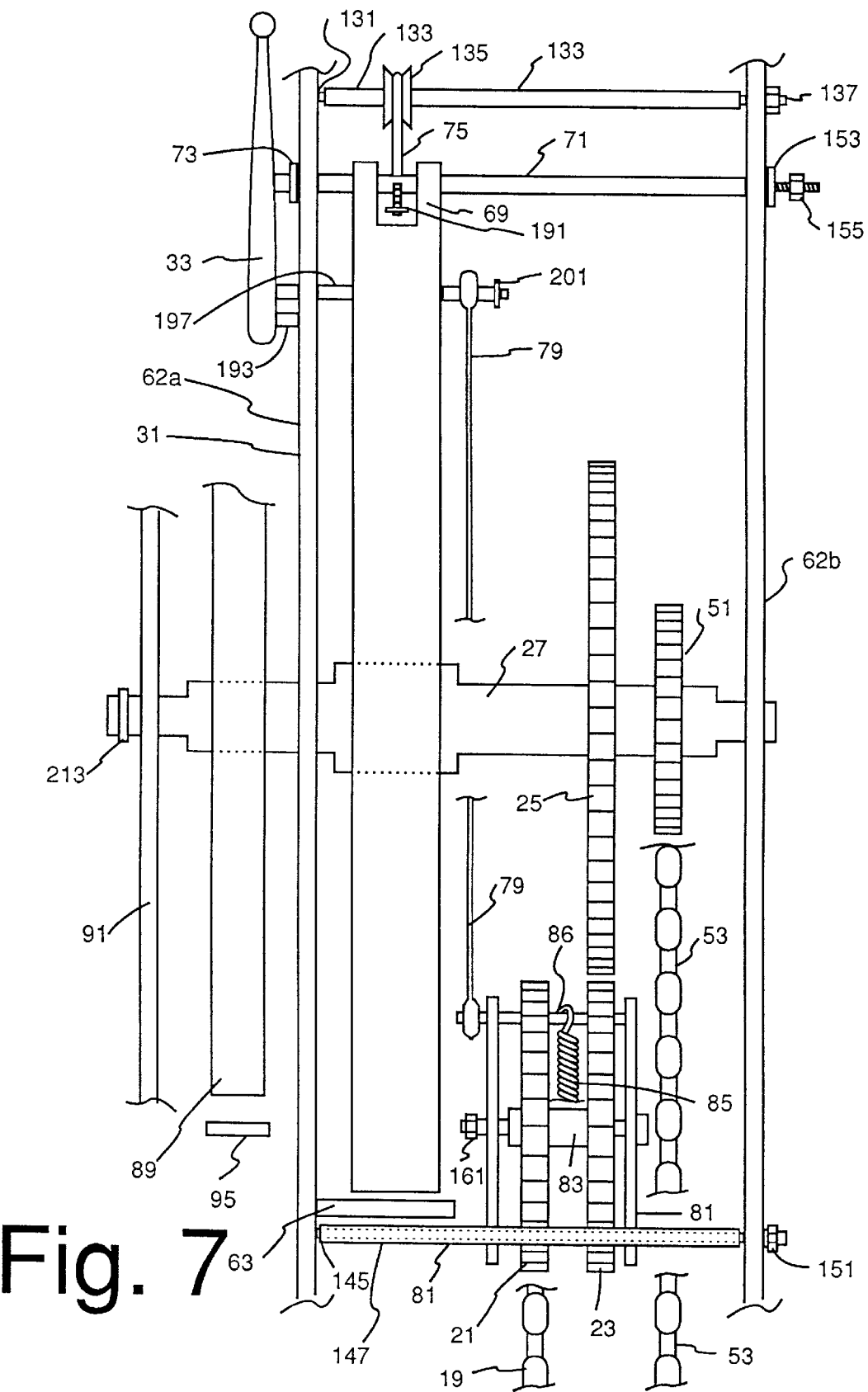

POWER-SPRING ASSIST TO PEDALS OF BICYCLE

CLAIM OF PRIORITY

This application claims the benefit of U.S. Provisional Application No. 60/056,743, filed Aug. 20, 1997.

BACKGROUND OF THE INVENTION

1. Field of the Invention

This invention relates to a power-spring assist to the pedals of a bicycle. Engagement of the spring assist is controlled by the rider by means of a throttle hand grip mounted on a handle bar of the bicycle. By turning the handle grip, the rider can release torque from the power-spring to the bicycle pedal assembly where it will, in turn, provide power to the rear wheel as needed, for example, when going uphill, or riding against a head wind. The rider of the bicycle can charge the power-spring when convenient, for example, while pedaling downhill or on the level. Alternatively, in a preferred embodiment, the rider can charge the spring before embarking by engaging a kick-stand to hold the bicycle in a stationary position by lifting the rear wheel off of the ground.

2. Description of the Prior Art

Already known in the art from U.S. Pat. No. 5,035,678 is the use of an energy-storing bicycle sprocket wheel drive system mounted to the bicycle pedal crankshaft. This system is mounted entirely on the pedal crank assembly and provides for the storage and release of energy at various points during each turn of the pedal crank. U.S. Pat. No. 1,408,459 describes a spring-powered bicycle in which the foot pedals charge a spring and the spring powers the rear wheel of the bicycle. The foot pedals move in an arc independent of each other, and the rider charges the spring by force to either or both of the pedals. There is no direct connection between the pedals and the drive wheel. Neither system allows the rider to charge the spring and release the spring energy at the convenience of the rider.

Also known in the art from U.S. Pat. No. 4,146,464 is a spring assist drive for a bicycle or tricycle which discloses a coil spring assembly, but this assembly functions as a continuous permanent operating drive, and is not selectively engagable by the rider. The coil spring cage is located above and to the rear of the axis of the rear drive wheel. The mechanism disclosed in this patent differs from that of the present invention.

SUMMARY OF THE INVENTION

One of the objects of this invention is to provide a power-spring assist that the rider can selectively engage to assist going up a hill, riding against a head wind or temporarily decrease the effort of bicycling. A further object of this invention is to develop a spring motor in which the rider can store energy when convenient and release at will. In a preferred embodiment, the rider can pre-charge the spring motor before embarking on the ride. The foregoing and other objects, features and advantages of the invention will be apparent from the following detailed description of the preferred embodiments which make reference to the several figures of the drawing.

IN THE DRAWINGS

FIG. 6 is an inside view of the same housing showing the location of the coiled power spring and the wound spring disengaging mechanism.

FIG. 7 is a cut-away view showing the relative positions of the gears on the pedal crank and the power assist device.

DETAILED DESCRIPTION OF THE PREFERRED EMBODIMENTS

Figure 1:
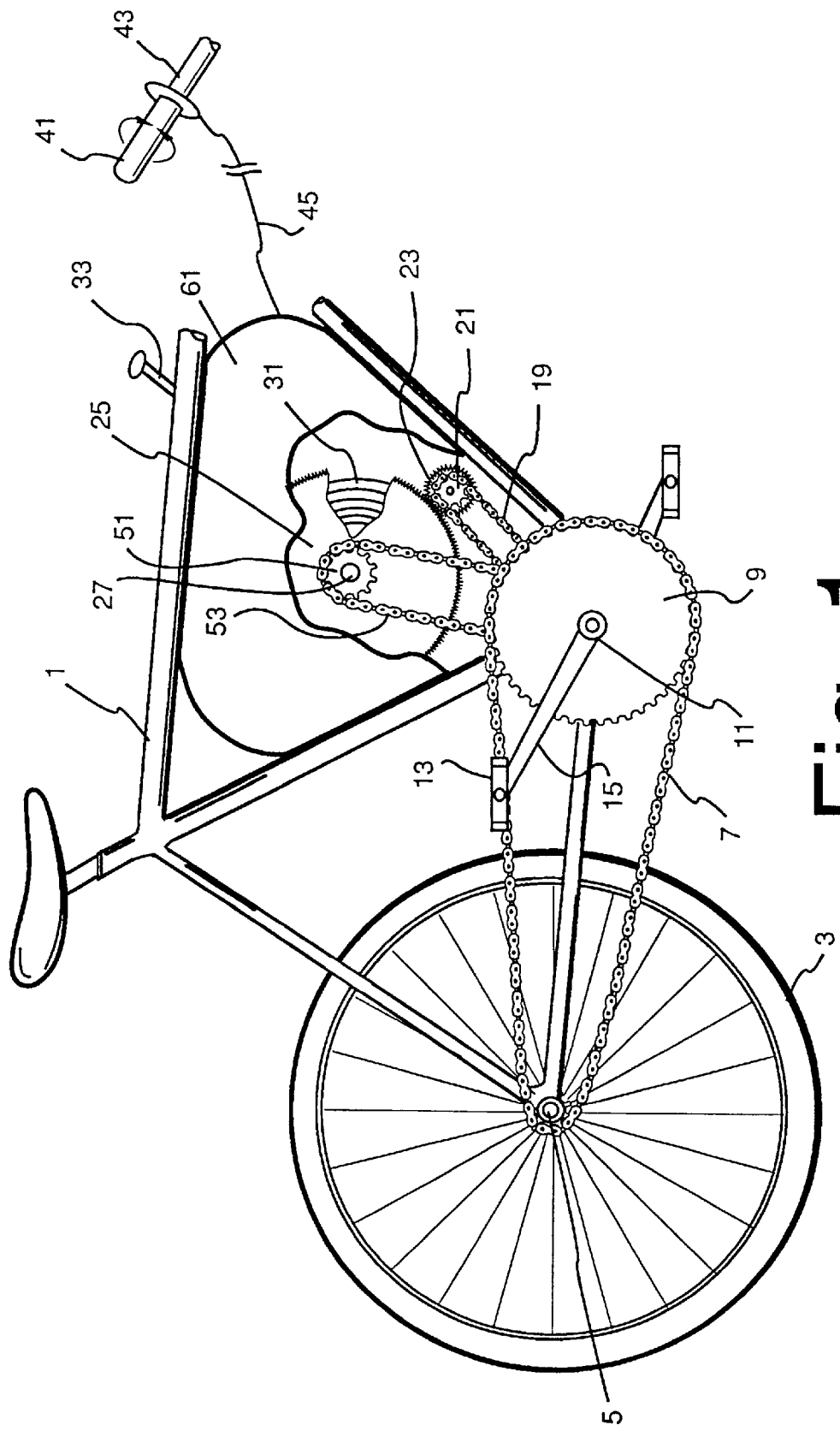
FIG. 1 is a partial cut-away side view of a bicycle frame with the power-spring assist shown within the frame.

FIG. 1 is a partial cut-away view showing a bicycle frame (1) which may be in typical diamond shape, or it may be modified to allow the power spring assist assembly to fit within. Rear drive wheel (3) is mounted to the frame at wheel hub (5) and driven in a typical fashion by drive chain (7). There may be more than one drive wheel on a common axis. Drive chain (7) is engaged by rear wheel drive sprocket wheel (9) which is attached to a crank and spindle assembly (11) supported by frame (1). Foot pedal (13) is attached to crank (15) mounted on spindle (11). A sprocket wheel (not shown) mounted on spindle (11) is connected by chain (19) to ratcheting sprocket wheel (21) mounted on a common bearing shaft (83) (not shown) with drive gear (23). Drive gear (23) engages power gear (25) mounted on a common hub (27) with coiled power spring (31). Power gear (23) can be engaged and disengaged from drive gear (25) by means of control arm (33).

A throttle-type hand grip (41) is mounted on the bicycle at a place convenient to the rider, such as on handle bar (43), and is connected by cable (45) to a releasable braking means not shown. When the braking means is released, the energy stored in power spring (31) engages and turns ratcheting sprocket wheel (51) which is connected by means of chain (53) to a sprocket wheel (101) (not shown) mounted on spindle assembly (11). Spring (31), power gear (25), sprocket wheels (21 and 51), drive gear (23) and portions of chains (19 and 53) are all contained within outer cover (61) which fits within bicycle frame (1).

Figure 2:
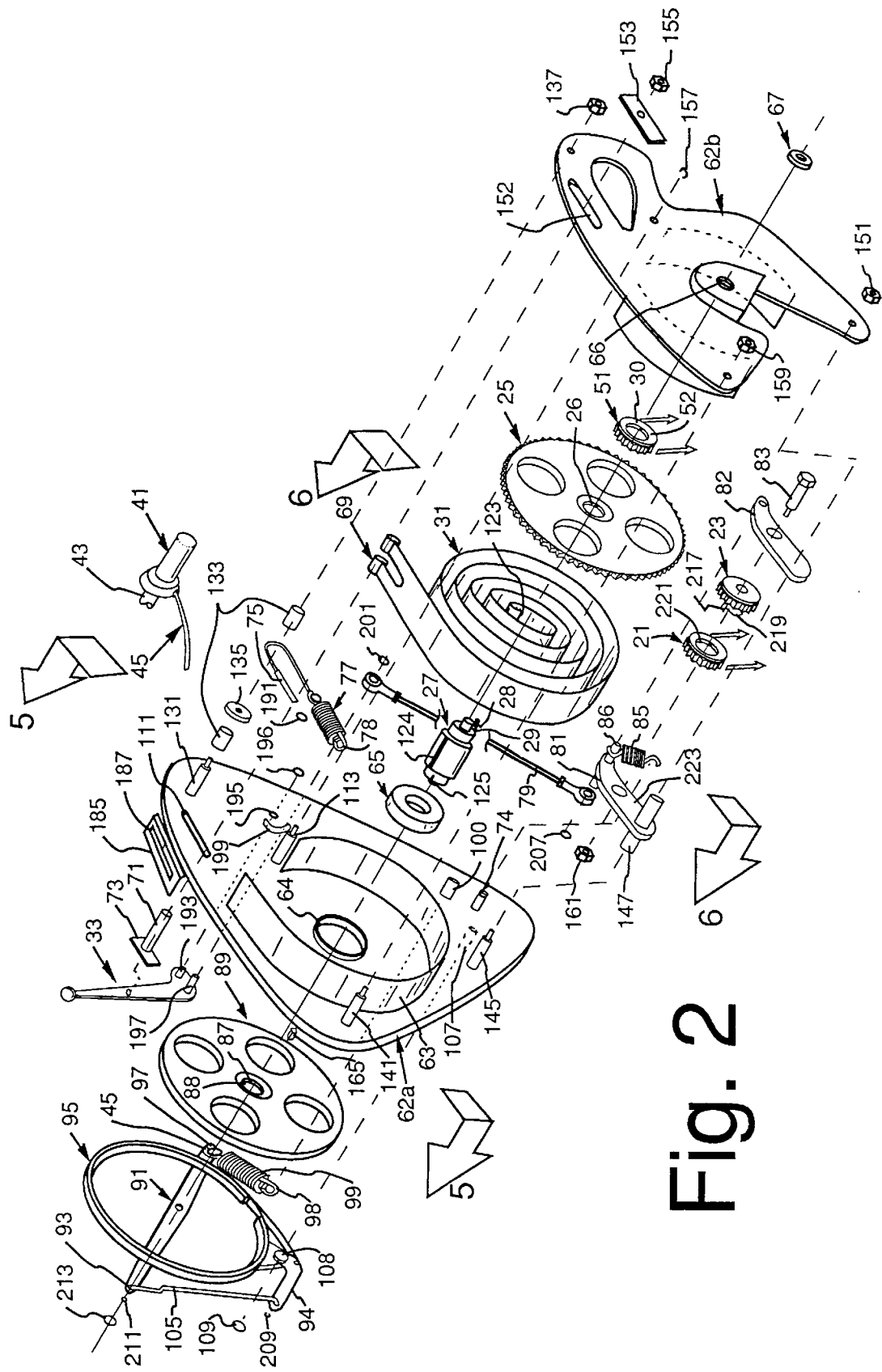
FIG. 2 is an exploded view of the power-spring assist mechanism showing the component parts and how they fit into each other.

FIG. 2 is an exploded view of the power-assist spring mechanism and the means for charging and engaging it. Ratcheting sprocket wheel means (21) is mounted on shoulder (219) of drive gear (23) and is connected by key (217) engaging slot (221) on wheel (21) and a corresponding slot on shoulder (219). Drive gear (23) within pivoted gear assembly (81) is releasably engaged to power gear (25). Power gear (25) is connected by means of a pin (28) and slot (26) to slot (29) in hub (27). Power spring (31) is also connected at interior end (123) by end (123) engaging slot (124), groove or other appropriately-shaped opening of hub (27). End (123) may be simply elbow-shaped, or curled back upon itself in an eye shape, or alternatively there may be a teardrop-shaped hole which can engage a suitable headed post extending from hub (27). In a preferred embodiment, end (123) is curled back upon itself, with a corresponding hole in the hub which will engage end (123) when spring (31) is being wound or is powering hub (27), but which disengages when hub (27) is turned in a clockwise direction to overextend spring (31). Hub (27) rotates on its longitudinal axis and is mounted in hub bearings (65) and (67), which are mounted in annular openings (64) and (66) of housing sides (62a) and (62b) respectively.

Outer end (69) of power spring (31) is mounted on spring anchor rod (71) which extends through slot (111) in housing (62a) and to which is mounted optional slot closure (73) between housing (62a) and control arm (33). Also attached to shaft (71) by means of nut (191) is one end of cable (75), which cable is connected at the other end to one end of extension spring (77). The other end (78) of spring (77) is attached to standoff (113) that originates on housing (62a). Outer end (78) is secured outside of housing (62b) by means of spring clip (157). Control arm (33) pivots about pivot shaft (193) extending through hole (195) in housing (62a), and shaft (193) is secured on the inside of housing (62a) by spring clip (196). Shaft (197) extending from control arm (33) extends through slot (199) in housing (62a) and one end of connecting rod or turnbuckle (79) is secured to shaft (197) by spring clip (201). The other end of rod (79) is attached to rod (86) on the pivoting end of pivoted gear assembly (81). Rod (86) originates on one side (82) of gear assembly, and terminates exterior to the other side (223) of such assembly outside the end of rod (79) where it is secured by spring clip (207). Within gear assembly (81) is bearing shaft (83) which extends from one side (82) of the assembly to the other side (223). Rotating on the axis of shaft (83) within the pivoted gear assembly is drive gear (23) having a shoulder (219) into which a slot has been cut to fit key (217). Ratcheting sprocket wheel (21) can be engaged with gear (23) by means of slot (221) into which key (217) also fits. Shaft (83) extends to the outside of side (223) and is secured by means of nut (161). Gear assembly (81) is held in a position such that drive gear (23) is normally disengaged by spring (85) secured at one end to rod (86) of the assembly and at the other end to anchor rod (74) extending from housing (62a). Gear assembly (81) can be selectively engaged by the rider moving control arm from the disengaged position in control arm guide (185) to engaged position (187).

Brake drum (89) is mounted on ratchet (87) which rotates about the axis of hub (27) and is secured by means of key (165) fitting slot (88) on the ratchet and slot (125) on a shoulder of hub (27). Lever arm (91) is also rotatably mounted on hub (27) just inside of spring clip (213). Rod (105) is secured to one end (93) of lever arm (91) by spring clip (211), and at the other end to pivoting brake arm (94) by spring clip (209). Brake arm (94) pivots on bearing surface (108) about rod (107) extending from housing (62a). When engaged, rod (93) pulls arm (94) upward, causing a tightening of brake band (95). The other end (97) of brake arm (91) is attached on one side to cable (45) which extends to throttle-type hand grip (41) mounted on handlebar (43) and on the other side to one end of tension spring (99) which is secured at the other end to anchor rod (100) extending from housing (62a). Housing side (62a) and other side (62b) and shroud (63) enclose the power spring mechanism.

Figure 3:
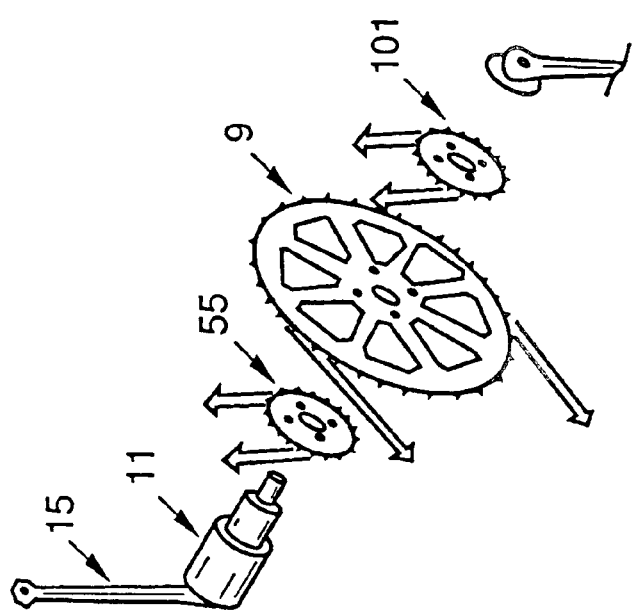
FIG. 3 shows an exploded view of the foot pedal and crank assembly.

FIG. 3 shows an embodiment of the crank and spindle assembly in which spindle assembly (11) has mounted on it crank (15), sprocket wheel (55) and power assist sprocket wheel (101). Although sprocket wheels (55) and (101) can be mounted on spindle assembly in any arrangement, in a preferred embodiment, both sprocket wheels (55 and 101) are positioned between the rear wheel drive sprocket wheel (9) and the bicycle frame.

Figure 4:
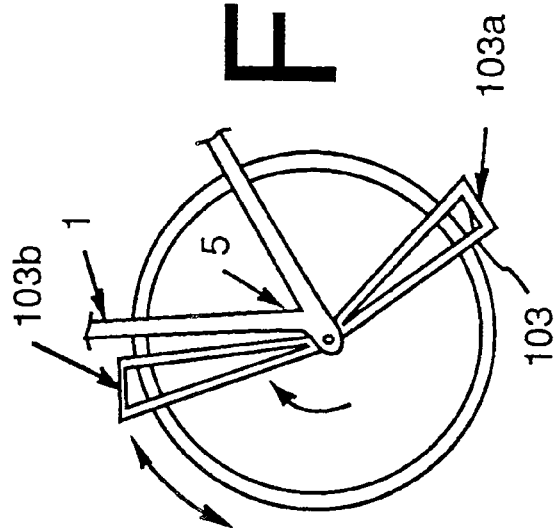
FIG. 4 shows a side view of a kick-stand which can be engaged to allow the rider to charge the power spring while the bicycle is stationary.

FIG. 4 shows a preferred embodiment in which kick-stand (103) is rotatably secured to bicycle frame (1) at or near wheel hub (5). When the rider moves the stand from retracted position (103b) to operative position (103a), the stand elevates the drive wheel off of the ground so that the power assist spring can be charged before departing on a ride.

Figure 5:
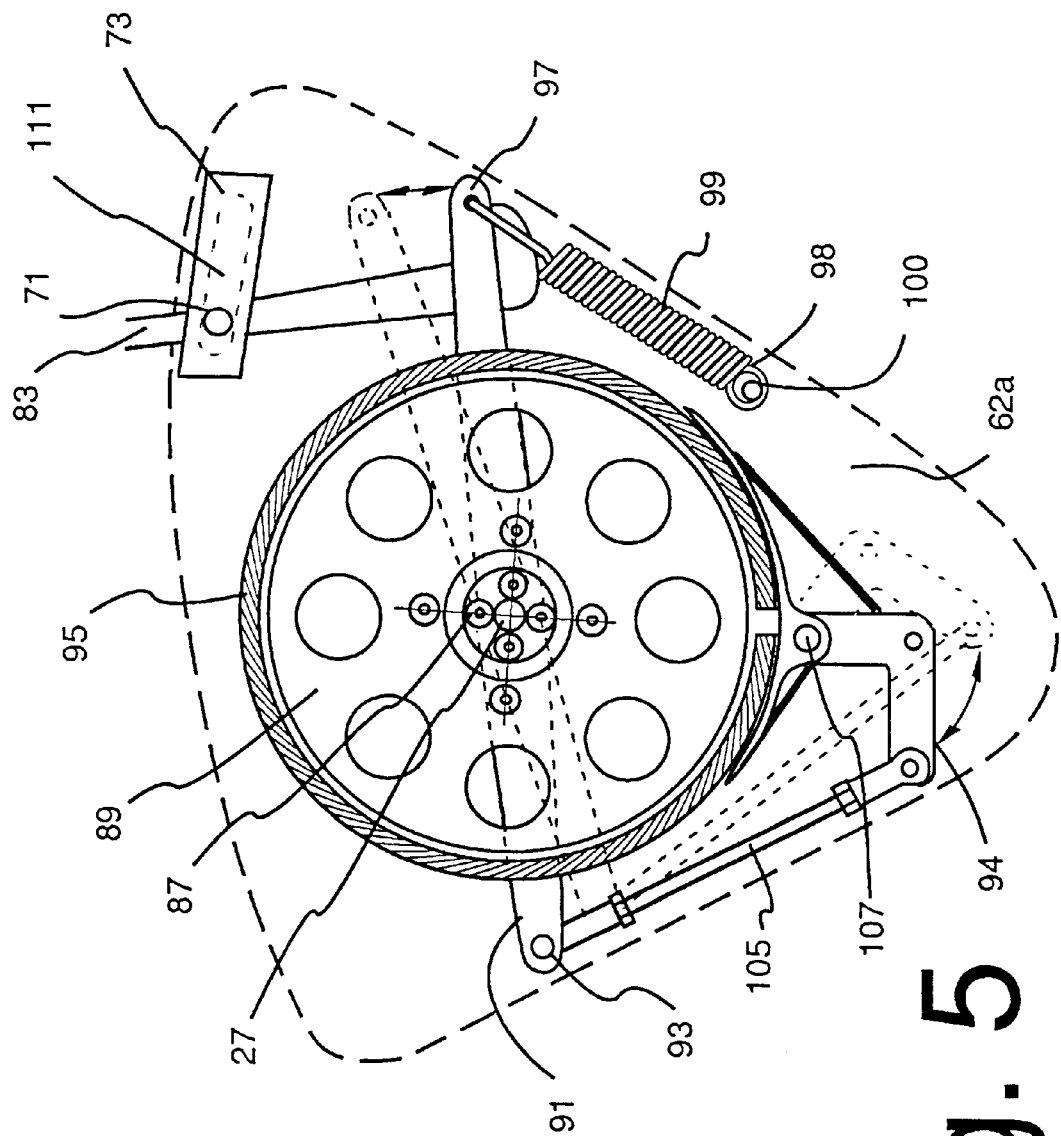
FIG. 5 is an inside view from one housing showing the brake drum, brake band and brake engaging mechanism.

FIG. 5 is a view from housing (62a) looking toward brake drum (89). Brake drum (89) is connected by means of keyed ratchet (87) to hub (27) on which is also mounted extended brake arm (91). End (97) of brake arm (91) is connected to tension spring (99) which is fastened on its other end (98) to anchor rod (100) extending from housing (62a). The other end (93) of brake arm (91) is connected by rod or turnbuckle (105) to pivoting end of pivoting brake arm (94) which pivots about rod (107). One end of brake band 95 is secured to rod (107) or other suitable fixed location, while the movable end of brake band (95) is connected to brake arm (94) at a distance away from the pivot point such that when brake arm (94) is engaged, brake band (95) is pulled tight against the outer rim of brake drum (89). Also shown is shift arm (33) to which is connected slot closure (73) and rod (71), which rod extends inwardly through slot (111) of housing (62a).

FIG. 6 is an inside view of the same housing (62a) of the power spring assist assembly. Shift arm (33) pivots about pivot axis (193). The movement of control arm (33) is limited by the shape of slot (111) in housing (62). Extending from arm (33) is rod (71) through which one end of cable (75) is secured by means of nut (191). Cable (75) extends around pulley (135) and is attached at its other end to one end of extension spring (77). The other end of extension spring (77) is secured on standoff (113). Power spring (31) (not shown) is coiled within shroud (63) of housing (62a).

FIG. 7 is a partial frontal view of power spring assist assembly (not to scale). Power spring (31) is mounted on hub (27) which rotates within housing members (62a) and (62b). When control arm (33) is rotated about pivot shaft (193) to the forward position, shaft (197) raises one end of connecting rod (79) which is retained on shaft (197) by spring clip (201). At its other end, connecting rod (79) raises pivoted gear assembly (81) to which it is connected by rod (86), overcoming the retracting force supplied by spring (85). Gear assembly (81) pivots on sleeve (147) positioned on standoff (145). Standoff (145) originates on housing (62a) and is secured at its other end to housing (62b) by nut or spring clip (151). Transversely mounted at a midpoint within gear assembly (81) is bearing shaft (83) secured at one end by nut (161). Mounted on shaft (83) are ratchet wheel (21) connected to chain (19) which is connected to a ratchet wheel (51) (not shown) on spindle (11) (not shown), and drive gear (23) which selectively engages power gear (25). In a preferred embodiment, the tension on chain 19 is adjustably maintained by a chain tension adjustment mechanism.

When ratchet wheel (21) is turned by chain (19), the ratchet wheel engages drive gear (23), which turns power gear (25). Rotation of power gear (25) through the common hub (27) winds power spring (31). When power spring (31) is wound to a predetermined amount, preferably about 90% to 95% of rated capacity, it overcomes the extending force applied to it by spring (77) (not shown) and moves rod (71) and connected control arm (33) backwards, lowering shaft (197) and the attached connecting rod (79), thus pivoting gear assembly (81) downward, disengaging gear (23) from power gear (25).

Cable (75) is secured at one end to rod (71) by nut (195), and extends over pulley (135) to connect at the other end to spring (77) (not shown). Rod (71) extends on one side from the control arm (33) through a slot in housing (62a), with a slot closure (73) positioned on rod (71) between the housing and the termination of one end of rod (71) control arm (33). The other end of rod (71) extends through a slot in housing (62b), and a slot closure (153) is positioned on rod (71)

between the housing and the termination of the other end of rod (71) where it is secured by nut or spring clip (155). Pulley (135) is mounted on standoff (131) and held in position by bushings (133) and secured by nut (137) exterior to housing (62b).

Also mounted on a hub (27) together with power spring (31) is a sprocket wheel (51) which is connected by chain (53) to sprocket (101) (not shown) on spindle (11) (not shown). Hub (27) extends through housing (62a) and has mounted on it brake drum (89) which can be selectively secured by brake band (95). Spring clip (213) rotatably secures lever arm (91) on hub (27) outside of brake drum (89). Shroud (63) attached to housing (62a) protectively encloses spring (31).

In operation, a rider may wish to charge power spring (31) before embarking by activating kick-stand (103) into the position shown at (103a) to allow drive wheel (3) of the bicycle to rotate about hub (5) without contacting the ground. To change the power spring, the rider will move control arm (33) forward within control arm guide (185) to position (187) raising shaft (197) and connecting rod (79), thus lifting pivoting gear assembly (81) and engaging gear (23) to engage drive gear (25). The rider, by placing feet on pedals (13) and turning cranks (15) in a clockwise direction about spindle (11), causes rotation of sprocket wheel (101) about spindle (11). Chain (19) transmits motion from sprocket wheel (101) to ratcheting sprocket wheel (21). Movement of wheel (21) in a clockwise direction engages the ratchet and turns drive gear (23). Drive gear (23), when pivot gear assembly is engaged, turns power gear (25) which is mounted on hub (27) as is one end (123) of power spring (31). As the rider turns pedals (13), power spring (31) is compressed in a counter-clockwise direction.

When power spring (31) is wound to a predetermined maximum state of compression, the expansive force overcomes the contractive force of extension spring (77), and extension spring (77) expands, pulling rearward on the control arm (33) lowering rod (79) and disengaging pivoted gear assembly (81) and gear (23), thus preventing over winding of spring (31). Power spring (31) may also be charged at the rider's convenience by selectively engaging drive gear (23) by activation with control arm (33) and idling rod (79).

Brake band (95) holds brake drum (89) and thus prevents release of energy and power spring (31) until the power assist feature is engaged by the rider. To engage the power assist mechanism, the rider will turn throttle grip (41) to create tension on cable (45) which overcomes the force of compression spring (99) on lever arm (91), causing end (93) of brake arm to loosen pivoting brake arm (94), thus expanding the circumference of brake band (95) and releasing its hold on brake drum (89). With the pressure on brake band (95) released, power spring (31) provides force to ratchet (52) which engages sprocket wheel (51). Sprocket wheel (51) imparts force to chain (53) which drives sprocket wheel (55) which is fixed on a common crank with and which drives sprocket wheel (9) attached by chain (7) to drive wheel (3) of the bicycle.

In free-wheeling mode, without the power assist being engaged, the rider will turn foot pedal (13) engaged by arm (15) to crank assembly (11) which will turn drive sprocket wheel (9) attached by chain (7) to drive wheel hub (5) of drive wheel (3). Brake band (95) secures brake drum (89) from movement by tension supplied by spring (99). Ratchet (87) within brake drum (89) allows hub (27) to turn while brake drum (89) is being held stationary by brake band (95). In the free-wheeling mode, the lever (33) is set such that gear (23) is disengaged from drive gear (25). Ratchet (52) within sprocket wheel (51) is not engaged when hub (8) is turning at a lesser angular speed than sprocket wheel (11).

An example of the benefits from the power spring assist are shown by the following approximate calculations:

15° grade 21% assist for 365 feet

7° grade 79% assist for 365 feet.

1° grade 238% assist (acceleration) for 365 feet.

These benefits will vary somewhat depending upon the various gear ratios and spring tension selected.

The attached table will show the relative positioning of the various elements of the present invention at various stages of the operation of the power assist:

TABLE 1

|  | Power Spring 31 | Brake 95 | Brake Drum 89 | Hand Grip 41 | Drive Sprocket Wheel 51 | Drive Gear 25 | Charging Sprocket Wheel 21 | Hub 27 | Sprocket Wheel 51 |
|---|---|---|---|---|---|---|---|---|---|
| Charging | Charging | Engaged | Still | Diseng. | Free | Charging | Engaged | Turning | Still |
| Free Wheeling | Still | Engaged | Still | Diseng. | Free | Still | Diseng. | Still | Still |
| Power Assist | Discharg. | Diseng. | Turning | Engaged | Engaged | Moving | Diseng. | Turning | Turning |

While the invention has been particularly shown and described with reference to certain preferred embodiments, it will be understood by those skilled in the art that various alterations and modifications in the form and detail may be made therein. Accordingly, it is intended that the following claims cover all such alterations and modifications as fall within the true spirit and scope of the application.

What is claimed is:

1. A power-spring assembly for a rider-propelled vehicle having a frame, one or more ground-engaging drive wheel mounted on said frame, a crank and spindle assembly mounted on said frame operatively connected to each said drive wheel, said power-spring assist assembly comprising:

(a) a coiled power spring attached at its inner end to a hub;

(b) a housing positioned within the frame of the vehicle and enclosing said power spring;

(c) means for selectively charging said power spring from said crank and spindle assembly, said means comprising a sprocket wheel mounted on said spindle assembly, a selectively disengagable pivoted gear assembly having a ratcheting sprocket wheel and a drive gear mounted on a common shaft, a power gear mounted on said hub in common with the inner end of the power spring, which power gear can be selectively engaged or disengaged with said drive gear, and a chain connecting the sprocket wheel on said spindle to said ratcheting sprocket wheel on said hub;

(d) means for storing and selectively releasing energy in said power spring;

(e) means for transmitting energy from said power spring to said drive wheel.

2. The power-spring assist assembly of claim 1 which further includes a kick stand means for disengaging the ground-engaging drive wheel from the ground while charging said power spring.

3. The power-spring assist assembly of claim 1 wherein said means for storing and selectively releasing energy in said power spring comprises a brake band and a brake drum, which brake drum is mounted on said hub.

4. The power-spring assist assembly of claim 3 wherein said means for storing and selectively releasing energy in said power spring includes a throttle-type hand grip mounted on a handlebar of the vehicle, which hand grip can be turned to engage and disengage said brake band by means of a cable.

5. The power-spring assist assembly of claim 1 wherein said means for transmitting energy from said power spring to said drive wheel comprises a ratcheting sprocket wheel mounted on said hub, a sprocket wheel mounted on said spindle assembly, and a chain connecting said sprocket wheels.

6. The power-spring assist assembly of claim 1 further comprising a means for disengaging said pivoted gear assembly from said power gear once said power spring is charged to a predetermined level.

7. The power-spring assist assembly of claim 1 which further comprises a chain tension adjustment mechanism.

8. The power-spring assist assembly of claim 5 which further comprises a chain tension adjustment mechanism.

9. The power-spring assist assembly of claim 1 wherein said means for selectively engaging or disengaging said pivoted gear assembly comprises a lever positioned on the top of said housing and controllable by the rider of said vehicle.

* * * * *